(12) United States Patent
Tanahashi et al.

(10) Patent No.: US 6,885,369 B2
(45) Date of Patent: Apr. 26, 2005

(54) METHOD AND APPARATUS FOR ACQUIRING LUMINANCE INFORMATION AND FOR EVALUATING THE QUALITY OF A DISPLAY DEVICE IMAGE

(75) Inventors: Kohsei Tanahashi, Fujisawa (JP); Masao Kohchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/076,753

(22) Filed: Feb. 13, 2002

(65) Prior Publication Data
US 2002/0118878 A1 Aug. 29, 2002

(30) Foreign Application Priority Data
Feb. 23, 2001 (JP) .......................... 2001-049242

(51) Int. Cl.[7] .................................................. G06T 5/00
(52) U.S. Cl. ........................ 345/426; 345/207; 345/589; 345/590; 348/189; 348/191; 382/169; 324/770
(58) Field of Search ................................ 345/207, 204, 345/593, 611, 426, 589, 590, 690, 694, 697; 348/383, 189, 191, 243, 253, 181; 382/167, 141, 168, 169; 358/302; 347/135, 255; 355/71; 324/770, 753, 96; 702/117

(56) References Cited
U.S. PATENT DOCUMENTS

| | | | | |
|---|---|---|---|---|
| 5,504,438 A | * | 4/1996 | Henley ........................ 324/770 |
| 5,572,444 A | * | 11/1996 | Lentz et al. ................. 702/117 |
| 5,793,221 A | * | 8/1998 | Aoki ............................ 324/770 |
| 5,870,205 A | * | 2/1999 | DeClerck et al. ............ 358/302 |
| 6,115,022 A | * | 9/2000 | Mayer et al. ................. 345/418 |
| 6,414,661 B1 | * | 7/2002 | Shen et al. ..................... 345/82 |
| 6,525,772 B2 | * | 2/2003 | Johnson et al. .............. 348/383 |

FOREIGN PATENT DOCUMENTS

| | | |
|---|---|---|
| JP | 10-002800 | 1/1998 |
| JP | 10-096681 | 4/1998 |
| JP | 2000-113188 | 4/2000 |

* cited by examiner

*Primary Examiner*—Almis R. Jankus
(74) *Attorney, Agent, or Firm*—H. Daniel Schnurmann

(57) ABSTRACT

A method for evaluating the quality of an image, for extracting a luminance gradient displayed on a display device and for evaluating local luminance unevenness caused therein. The method includes the steps of: subdividing the image to be used as an evaluation object into a plurality of pixels; acquiring a first luminance information by calculating the difference between the sum of luminance values of predetermined pixels and the luminance value of a predetermined pixel, the predetermined pixels forming a first pixel group surrounding the predetermined pixel; acquiring a second luminance information by calculating the difference between the sum of luminance values of predetermined pixels and the luminance value of the predetermined pixel, the predetermined pixels constituting a second pixel group; acquiring a third luminance information by adding the first luminance information and the second luminance information; and evaluating the luminance of a screen photographed based on the third luminance information.

17 Claims, 12 Drawing Sheets

METHOD AND APPARATUS FOR ACQUIRING LUMINANCE INFORMATION AND FOR EVALUATING THE QUALITY OF A DISPLAY DEVICE IMAGE

FIELD OF THE INVENTION

The present invention relates to a method and apparatus for inspecting the quality of an image displayed on a display device, and more particularly, to a method and apparatus for evaluating the luminance of the display device.

BACKGROUND OF THE INVENTION

Various quality inspections are typically performed in the manufacturing process of a liquid crystal display. Among those inspections is an inspection for judging the quality of the image displayed on a display. Since it is not easy to evaluate the image quality by way of an inspection apparatus, typically, a visual inspection (i.e., sensory inspection) has been performed heretofore. In a sensory inspection, a sample image is used as a reference of the image quality being prepared, and a visual comparison is made between the sample image and the image used as the inspection object on the display to determine the quality of the image being inspected. However, since the sensory inspection depends on human visual senses, variations in judgment result, making it dependent on the inspector performing the inspection. These variations are unavoidable. It can be said that in a sensory inspection, judgment is based on information related to differences appearing on the image and areas of regions that differ in luminance. However, it is not easy to distinguish the region where local luminance differences occur from a region where a gentle gradation unevenness is present, particularly, since judgment variations depend on the inspector.

As the judgment method is replaced with the sensory inspection described above, heretofore, various methods of evaluating image quality quantitatively have been proposed as, for instance, in the gazettes of Japanese Patent Laid-Open No. Hei 10 (1998)-2800, Japanese Patent Laid-Open No. Hei 10 (1998)-96681 and Japanese Patent Laid-Open No. 2000-113188. However, it is difficult to properly extract luminance unevenness caused on the liquid crystal display from existing conventional methods. By way of example, in a conventional liquid crystal display, ideally, light emitted from a light source (called a backlight) is evenly irradiated onto a panel forming the liquid crystal display. In practice, there is to some extent a luminance gradient on the panel. Moreover, in some cases, the liquid crystal display shows a local luminance unevenness while having such an overall luminance gradient. The methods disclosed in the gazettes of Japanese Patent Laid-Open No. Hei 10 (1998)-2800 and Japanese Patent Laid-Open No. Hei 10 (1998)-96681 are aimed at a CRT display. Therefore, the proposed methods make it difficult to extract the luminance gradient displayed on the liquid crystal display, and the local luminance unevenness which is present in the luminance gradient. The method disclosed in the aforementioned referenced gazette of Japanese Patent Laid-Open No. 2000-2113188 serves its purpose for detecting unevenness on color filters for use in the liquid crystal display. Similarly, the methods disclosed in the gazettes of Japanese Patent Laid-Open No. Hei 10 (1998)-2800 and Japanese Patent Laid-Open No. Hei 10 (1998)-96681, describes the difficulties for extracting the luminance gradient displayed on the liquid crystal display and the local luminance unevenness caused therein.

OBJECTS & SUMMARY OF THE INVENTION

Accordingly, it is an object of the present invention to provide a method for extracting and evaluating the luminance gradient displayed on a liquid crystal display and the local luminance unevenness caused therein.

It is another object to inspect an image displayed on a display device and determine quantitatively its quality.

The present invention provides various evaluation methods for achieving the foregoing objects.

In a first aspect of the invention, a method is provided for extracting the luminance gradient displayed on the liquid crystal display and the local luminance unevenness caused therein. The inventive method includes the steps of: (a) subdividing an image to be used as an evaluation object into a plurality of pixels; (b) adding the luminance information provided by the plurality of pixels from those pixels placed at the nth. position and, then, at the $m^{th.}$ position (wherein n<m) from a selected pixel inclusively and surrounding the selected pixel. Then, the luminance information of the specified pixel is subtracted from the added luminance information; and (c) quantitatively evaluating the sensory inspection by use of luminance information based on the luminance information acquired in step (b), wherein, the luminance information is the difference between the specified pixel and the pixel existing in the periphery thereof.

The luminance information at the $m^{th.}$ position is referred to as a "peripheral difference value" and the luminance information acquired at the $n^{th.}$ position is referred to as a "double peripheral difference value" since it is based on the two peripheral difference values. The overall method of acquiring the peripheral difference values is referred to as a peripheral difference method, and the method of acquiring the double peripheral difference value as a double peripheral difference method. Specifically, the present invention evaluates the image quality quantitatively using the aforementioned peripheral difference method or the double peripheral difference method.

The present invention provides further a method of acquiring luminance information, including the steps of: a) subdividing image data of a photographed image into a plurality of pixels; and b) calculating the difference between the sum of luminance values of predetermined pixels and a luminance value of a specified pixel among the plurality of pixels, the predetermined pixels constituting a pixel group surrounding the specified pixel.

Thus, the image quality is evaluated quantitatively by use of the acquired luminance information. Moreover, it also evaluates the luminance gradient and the local luminance unevenness caused therein by obtaining two components of the luminance information when applying the double peripheral difference method.

The method of the present invention further allows an image to be photographed by a CCD camera, subdividing the image data in response to the resolution (or a pixel number) of the CCD camera. Moreover, the method makes it possible to obtain luminance values of predetermined pixels in the difference calculation step.

In the method of acquiring luminance information, it is not required that the pixel group have an orientation along a specified pixel. For example, in the case when a plurality of pixels includes those spaced away from the specified one by a predetermined number of pixels, the pixels are linearly arrayed, set as a pixel group along a given orientation. It is preferable that the pixel group be configured isotropically with respect to the specified pixel, e.g., the form including one that surrounds the specified pixel in a rectangular layout and the specified pixel in a circular arrangement.

Furthermore, in the method of acquiring luminance information of the present invention, while the pixels forming the pixel group surround the specified pixel are adjacent to one another, the pixels are extracted from a plurality of pixels placed in a circular arrangement at intermittent positions. For example, the pixel group may be pixels selected alternatively from among pixels arranged continuously. Since the number of pixels forming the pixel group affects the operation processing speed, it is desirable that the pixels forming the pixel group be selected accordingly.

The present invention further evaluates the image quality based on acquiring luminance information. It provides a method of evaluating the image quality that includes the steps of: a) subdividing the image of a photographed image into a plurality of pixels; b) calculating a first luminance information as the difference between the sum of luminance values of predetermined pixels and the luminance value of a specified pixel from the plurality of pixels, the predetermined pixels forming a first pixel group surrounding the specified pixel; c) calculating a second luminance information as the difference between the sum of luminance values of predetermined pixels and the luminance value of the specified pixel, the predetermined pixels surrounding the specified pixel and positioned farther away from the specified pixel than the first pixel group; d) acquiring a third luminance information based on the first and the second luminance information; and e) evaluating the luminance of a screen photographed based on the third luminance information.

In the method of evaluating image quality of the present invention, the first luminance information calculation step extracts the local luminance unevenness, and the second luminance information calculation extracts the luminance unevenness caused on the entire image. The first pixel group for use in the first luminance information calculation step is located within the second pixel group for use in the second luminance information calculation step. Hence, the first luminance information is referred to as the inner difference value, and the second luminance information, as the outer difference value. The acquired third luminance information is based on the inner difference value and the outer difference value, e.g., by adding or subtracting these values. The third luminance information is referred to as a double peripheral difference value. The method evaluates the image quality employing a double peripheral difference value based on the inner difference value and the outer difference value, the inner difference value extracting the local luminance unevenness, and the outer difference value extracting the luminance unevenness caused on the entire image. Therefore, the method of evaluating image quality of the present invention takes full advantage of the image inspection of a liquid crystal display.

The evaluation step includes a digitizing processing step for extracting singular value data by subjecting the third luminance information to a digitizing process that uses a specified threshold value. It further includes calculating the evaluation value by multiplying the area of the block and luminance values of pixels, the block relating to the singular value data obtained by the digitizing processing step, and the pixels included within the block. Furthermore, when evaluating the image quality, the third luminance information calculation step adds the first and second luminance information. In this addition, the third luminance information calculation step further includes weighting the first and the second luminance information, and adding them up. Several types of unevenness on the liquid crystal display that are related to the luminance exist, the unevenness differing in position, size and form. It is thus possible to properly extract the unevenness to be inspected by setting weights between the inner difference value and the outer difference value. Specifically, the method of evaluating the image quality determines the weights in response to the image to be evaluated. In an actual image quality inspection, various types of unevenness are evaluated by executing the addition step a number of times while changing the weights.

The present invention provides further an apparatus for acquiring luminance information. More specifically, the apparatus for acquiring luminance information of an image displayed on the display device that includes: a) photographing means for photographing the image displayed on the display device; b) image processing means for dividing image data relating to the image photographed by the photographing means; and c) operation means for executing operation processing represented by the following equation (1) for the image data divided by the image processing means.

$$A(x,y)=[\Sigma pi - I(x,y)] \qquad (1)$$

where pi represents the luminance values of pixels forming a pixel group surrounding a pixel from the image data at a position defined by (x, y); and I(x, y) represents the luminance value of the pixel at the position defined by (x, y) of the image data.

In the present invention, the first term of the aforementioned equation is the sum of the luminance values of the pixels forming the pixel group and surrounding the pixel existing at position (x, y) of the image data, and I(x, y) of the second term is the luminance value of the pixel at position (x, y) of the image data. Therefore, A(x, y) is the peripheral difference value for the pixel existing at position defined by (x, y). Specifically, the apparatus of acquiring luminance information of a display device acquires luminance information by way of the peripheral difference value.

In the apparatus of acquiring luminance information of the display device, the operation means executes the operation processing represented by the above equation for the entire pixel population obtained by subdividing the image data. By doing so, the peripheral difference values is obtained for the entire photographed image, providing a quantitative way for evaluating the image quality.

In the apparatus of acquiring luminance information of the display device of the present invention, pi in the above equation represents the luminance information of a pixel existing at an n-th position (n being an integer >1) from the pixel positioned at (x, y), inclusively. By properly setting n, the local luminance unevenness in the vicinity of the pixel at (x, y), and the luminance gradient of the entire image is then extracted. According to the apparatus of acquiring luminance information of the display device, the inspection apparatus is capable of addressing the luminance unevenness in various forms.

In still another aspect of the invention, there is provided an apparatus of evaluating the image quality of a display device to which the apparatus for acquiring luminance information described above is applied. Specifically, the apparatus for evaluating the image quality of a display device includes: a) photographic means for photographing the image displayed on the display device; b) image process means for dividing image data related to the image photographed by the photographic means; and c) operation means for executing operation processing represented by the following equation (2) for the entire image data divided by the image processing means and for quantifying the photographed image based on P(x, y) as the luminance information obtained by the operation processing, and wherein.

$$P(x,y)=a\left[\Sigma pi-I(x,y)\right]+b\left[\Sigma po-\alpha I(x,y)\right] \quad (2)$$

Where pi represents luminance values of pixels forming a first pixel group in a linearly symmetrical arrangement with respect to a position (x, y) from the image data, po represents the luminance values of pixels constituting a second pixel group forming a linearly symmetrical layout with respect to the position (x, y) from the image data, the second pixel group being located outside the first pixel group; and I(x, y) represents the luminance value of a pixel at the position (x, y), with a, b, alpha being either 0 or positive numbers The apparatus of evaluating image quality of a display device calculates P(x, y) which represents the above-described double peripheral difference value, and when evaluating the image quality of the display device, the local luminance unevenness and the luminance gradient of the entire image is extracted.

In the apparatus of evaluating the image quality of a display device, the first pixel group is formed by the $n^{th}$ pixels (n being an integer >1) from pixels existing at the position (x, y) inclusive, and the second pixel group by the $m^{th}$ pixels (where m>n) from the pixel at the position (x, y), inclusive. By properly setting n and m, it is possible to extract the luminance unevenness information.

In the apparatus of evaluating image quality of a display device, the coefficients a and b define the weights, respectively, when the inner and outer difference values are added. Hence, a and b satisfy: a+b=1.0, and are determined in response to the feature of the image to be evaluated. Herein, a or b may be 0, whereas alpha is determined in response to the value of m. For example, if the value of m becomes large, I(x, y) can be ignored for the sum of po. In this case, the operation processing is performed assuming that alpha is 0.

BRIEF DESCRIPTION OF THE DRAWINGS

For a more complete understanding of the present invention and the advantages thereof, reference is now made to the following description taken in conjunction with the accompanying drawings.

DESCRIPTION OF THE PREFERRED EMBODIMENT

Figure 1:
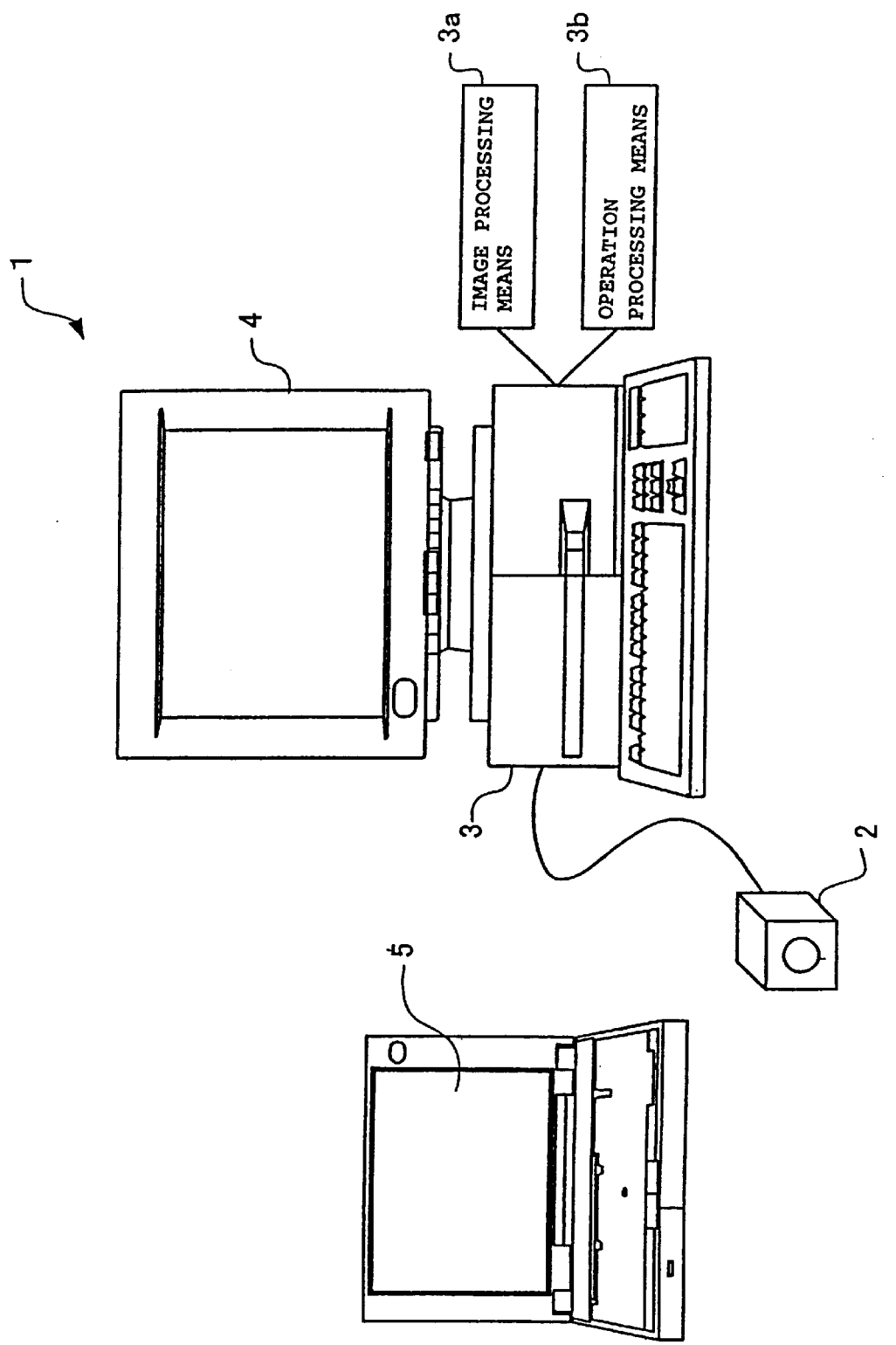
FIG. 1 shows a system configuration of an inspection apparatus according to the present invention.

Referring to FIG. 1, there is shown a system configuration of an inspection apparatus 1 according to the invention. Apparatus 1 inspects the luminance unevenness of liquid crystal display 5 as the body to be inspected. The inspection apparatus 1 for the liquid crystal display consists of a color CCD camera 2, a personal computer (PC) 3 and a monitor 4. The personal computer (PC) 3 includes image processing means 3a and operation processing means 3b. Color CCD camera 2 photographs a display surface of the liquid crystal display 5 as the body to be inspected. Camera 2 is a conventional camera having lenses, color filters and charge coupled devices (CCD) for taking in R, G and B signals. Image data of an image photographed by the color CCD camera 2 is subjected to a specified image processing using image processor 3a. Moreover, the operation processor 3b executes an operation for the peripheral difference method to be described hereinafter by way of the image data processed in image processor 3a. The monitor 4 displays the image photographed by color CCD camera 2, inspection results and the like.

Figure 2:
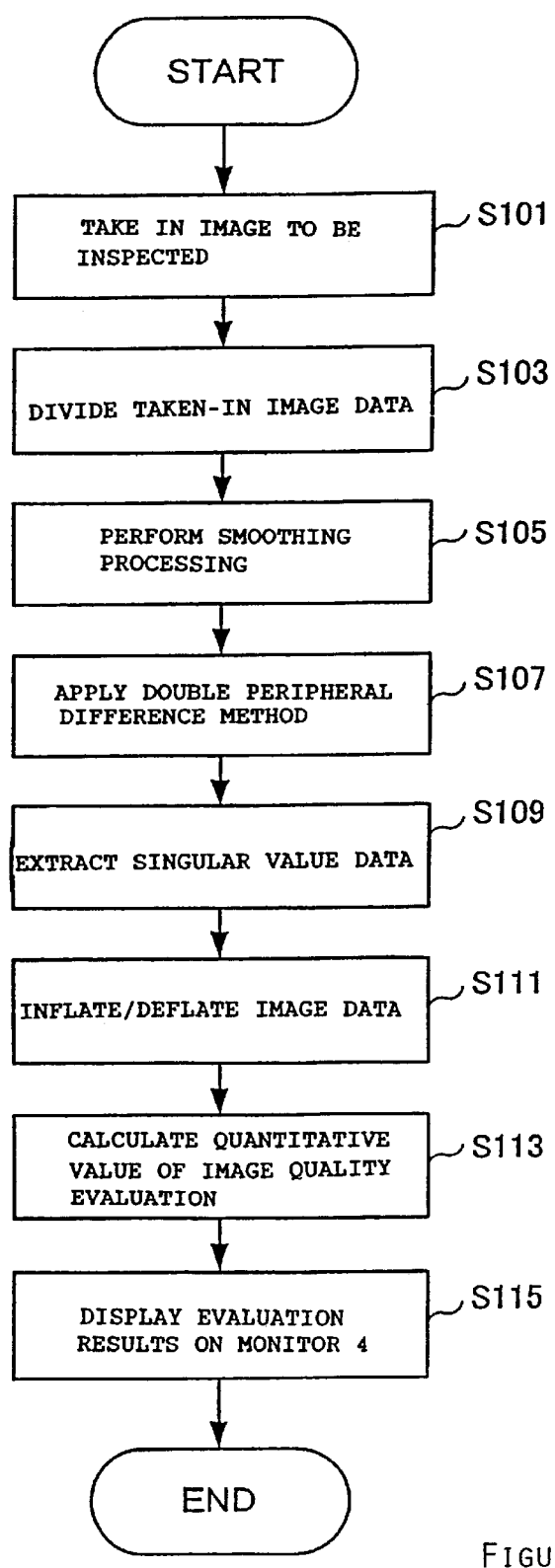
FIG. 2 is a flowchart illustrating the steps in combination illustrate the method of inspection, according to the invention.

FIG. 2 is a flowchart showing an embodiment of the inspection method according to the present embodiment. Each step is denoted by a reference to code S (FIG. 2). The inspection method according to this embodiment is performed by a series of steps that includes: providing an image to be inspected (S101); processing the image data by division (S103); smoothing process (S105); applying the double peripheral difference method (S107); singular value data extraction process (S109); image inflation/deflation process (S111); calculating a quantitative value of image quality evaluation (S113); and displaying the evaluation results (S115).

Following are the respective steps described in more detail:

S101: Providing the Image to be Inspected

A display image (i.e., the inspection object) is photographed by color CCD camera 2 on liquid crystal display 5. The image data of the photographed image is subject to a shading correction using image processor 3a. The shading correction represents a mismatch of conversion characteristics between the image data and the original luminance of the image to be inspected caused by limb darkening and unevenness in the photographing devices in color CCD camera 2.

Figure 3:
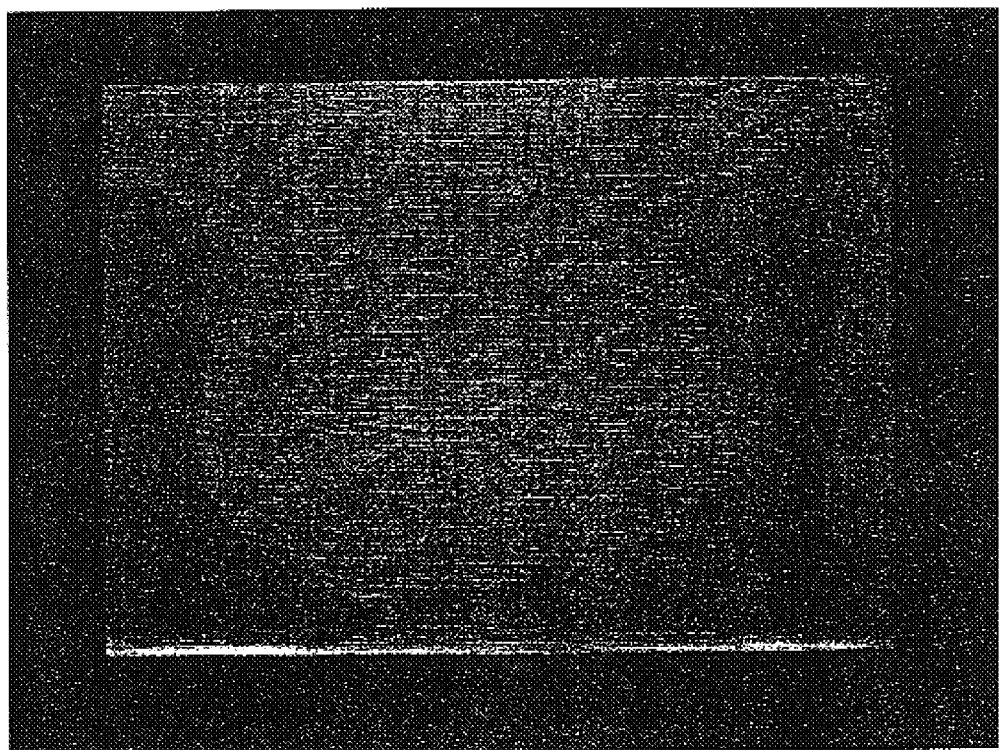
FIG. 3 shows an image as an inspection object according to the invention.

FIG. 3 shows the displayed image as an inspection object on the liquid crystal display 5. As shown, a whitish unevenness occurs on a lower portion of the displayed image.

S103: Subdividing the Image Data

The image data obtained in step S101 is subdivided in a matrix. Such division of the image data is a preparatory process step for executing the double peripheral difference method (S107). It is assumed that the image data is subdivided into n by m pixels. Positions of the pixels obtained by the subdivision can be specified by two-dimensional coordinates (x, y). The number n by m corresponds to the number of pixels (resolution) of the color CCD camera 2 since the color CCD camera 2 is used as an image photographing means. Although the maximum number of pixels obtained by the division represents the number of pixels (resolution) of color CCD camera 2, it may be lower than the maximum.

S105: Smoothing Process

For the image data divided in S103, a smoothing process for removing noise is performed, e.g., by performing a 2 by 2 filtering.

S107: Application of a Double Peripheral Difference Method

Figure 4:
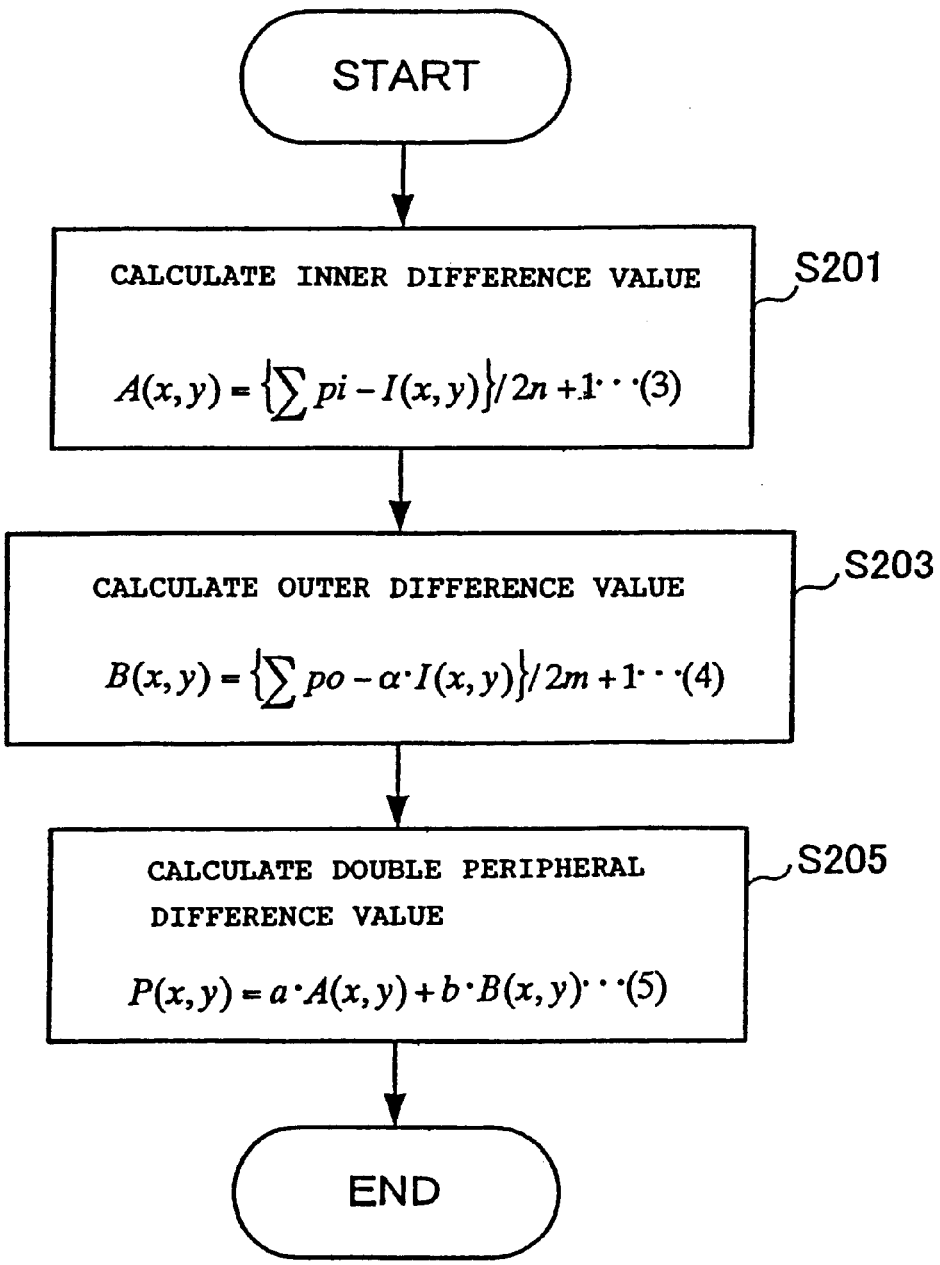
FIG. 4 is a flowchart illustrating the steps in combination illustrate the double peripheral difference method, in accordance with the invention.

For the image data from which noise was removed (S105), the double peripheral difference method is executed on the premise that the luminance value of each pixel is obtained. FIG. 4 is a flowchart showing the process of applying the double peripheral difference method. As explained in step S107, the inner difference value shown by equation (3) is calculated (step S201). Next, the outer difference value shown by equation (4) is obtained (S203). Subsequently, the double peripheral difference value shown by equation (5) is calculated by adding the inner difference value obtained in S201 and the outer difference value obtained in S203. Hereinafter, description will be made for the specific contents of S201 to S203. Note that the order of S201 for calculating the inner difference value and S203 for calculating the outer difference value may be exchanged. Equations (1) to (3) are empirical equations. The same applies to 2n+1 (third term) of equation (3), alpha (second term) and 2m+1 (third term) of equation (4), and coefficients a and b of equation (3).

$$A(x,y) = [\Sigma pi - I(x,y)]/2n + 1 \quad (3)$$

$\Sigma pi$ is the first term $I(x, y)$ is the second term $2n+1$ is the third term and where pi is the luminance value of a pixel constituting a pixel group surrounding a pixel existing at a position denoted by (x, y) in the image data, I(x, y) is a luminance value of a pixel at a position (x, y), and n represents the number of pixels from a specified pixel to a first pixel group.

$$B(x,y) = [\Sigma po - \alpha I(x,y)]/2m + 1 \quad (4)$$

$\Sigma po$ is the first term $\alpha \cdot I(x, y)$ is the second term $2m+1$ is the third term and where po is the luminance value of a pixel forming a pixel group surrounding the pixel existing at position (x, y) in the image data; I(x, y) is the luminance value of a pixel at a position (x, y); n is the number of pixels existing when going from a specified pixel group to a second pixel group; and alpha is a positive number greater or equal to 0.

$$P(x,y) = a\, A(x,y) + b\, B(x,y) \quad (5)$$

where a, b are positive numbers satisfying a+b=1.0

S201: Calculation of the Inner Difference Value.

Figure 5:
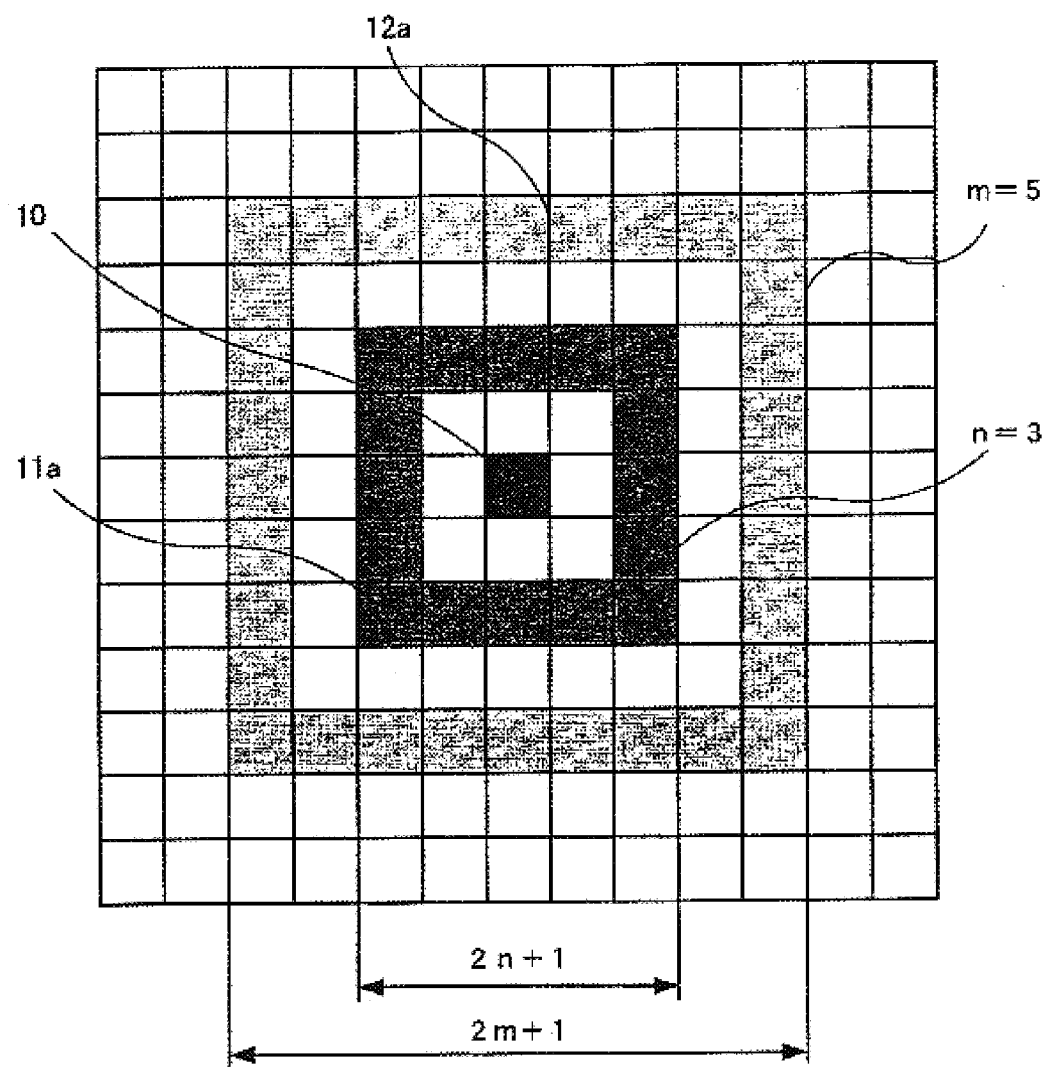
FIG. 5 is a view for explaining the double peripheral difference method according to the present invention

In order to obtain the inner difference value, the operation based on the equation (3) is performed as described above. With reference to FIG. 5, the content of equation (3) will now be described. Note that FIG. 5 shows the image data obtained by division (S103).

In equation (3), the first term represents the sum of the luminance of the pixels existing at the $n^{th}$ positions from a specified pixel 10, inclusive. In FIG. 5, the blackened pixel is the specified pixel 10. A first pixel group 11a consisting of a plurality of pixels existing at the $n^{th}$ positions from the specified pixel 10 inclusive, is shaded in dark gray. [Note that FIG. 5 is an example for n=3]. The second term in equation (3) indicates the luminance value of the specified pixel 10. The third term of equation (3) is the number of pixels included in the pixel row at the $n^{th}$ position from the specified pixel 10 inclusive. Depending on the position of the specified pixel 10, no pixel is usually present in the $n^{th}$ position. Still, a pixel may be allowed to exist in the $n^{th}$ position by mirroring, and a luminance value of the pixel can be used for the operation. Calculation of the outer difference value in S203 is performed in a similar manner as above.

S203: Calculation of the Outer Difference Value

The outer difference value is calculated by the operation based on the equation (4) as described above.

In equation (4), the first term represents the sum of the luminance of the pixels existing in the $m^{th}$ positions from the specified pixel 10, inclusive. Note that, since n<m, the operation process by equation (3) is referred to as the calculation of the inner difference value, and the operation processing by equation (4) as calculation of the outer difference value. In FIG. 5, the second pixel group 12a consisting of a plurality of pixels at the $m^{th}$ positions from the specified pixel 10 inclusively, and are painted in light gray. FIG. 5 shows an example for m=5.

The second term of equation (4) indicates the luminance value of the specified pixel 10. This second term is common to the corresponding one in equation (3) except for the coefficient alpha. Furthermore, the third term in equation (3) is the number of pixels included in a row formed by the pixel group in the $m^{th}$ position from the specified pixel 10.

Figure 10:
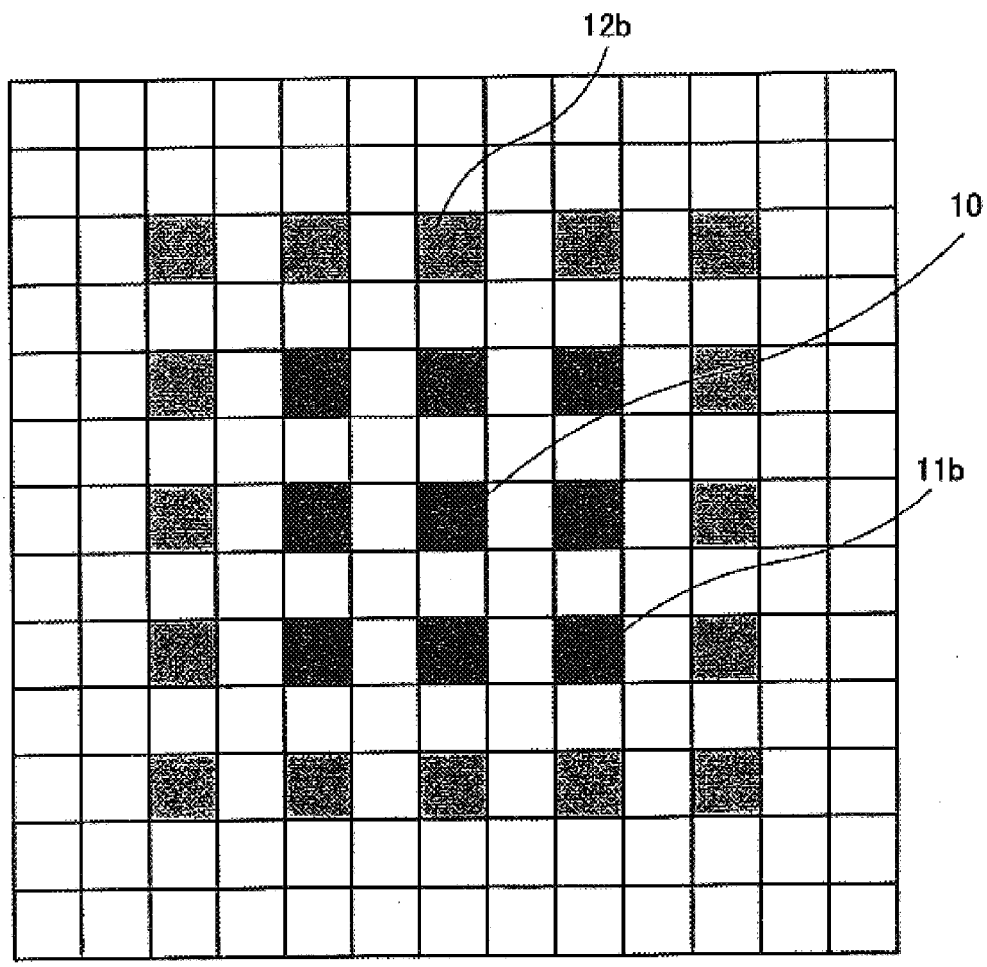
FIGS. 10–12 are respective views of an example of a first pixel group and a second pixel group.
Figure 11:
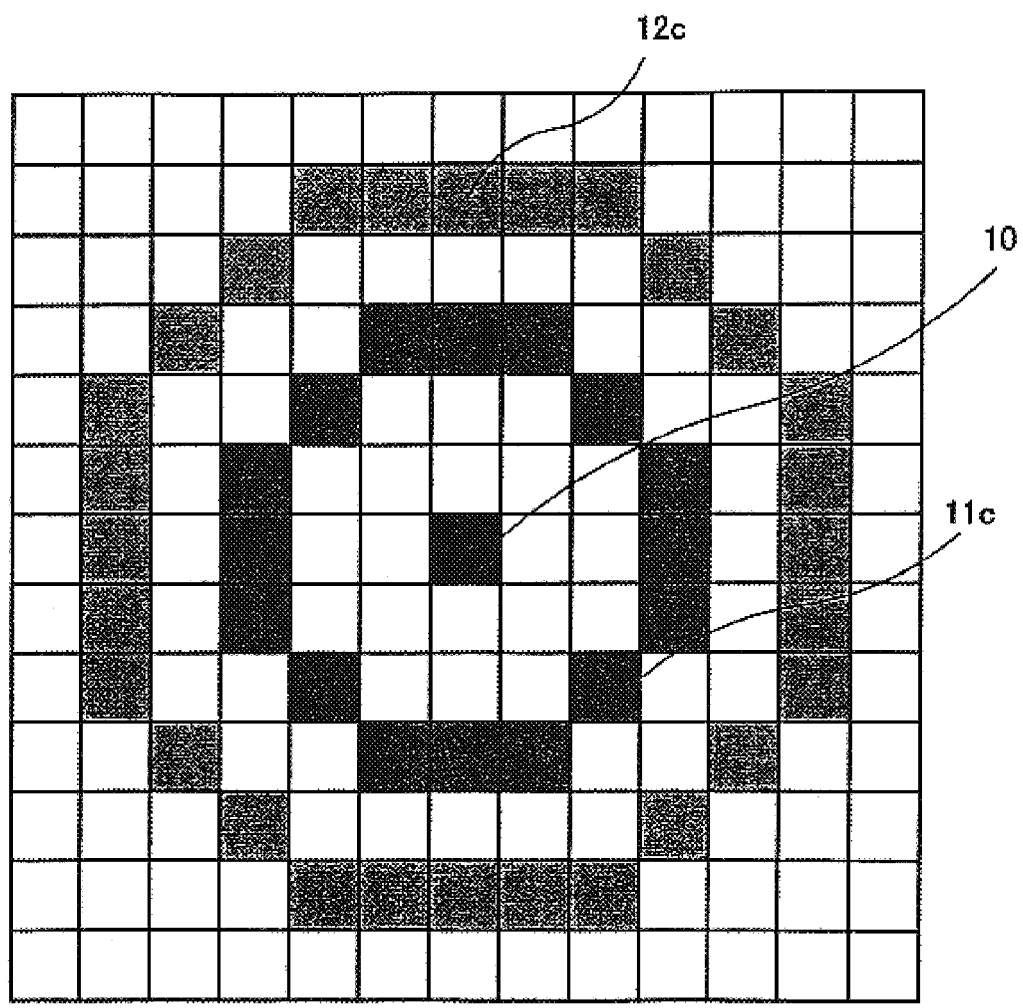

In the present embodiment, the first pixel group 11a for calculating the inner difference value and the second pixel group 12a for calculating the outer difference value are arranged as shown in FIG. 5. However, these pixel groups may be advantageously arranged in differently. For example, the layout shown in FIGS. 10 to 12 can be adopted. In FIG. 10, the first pixel group 11b and the second pixel group 12b are respectively formed by pixels selected alternatively from the continuous pixels. Specifically, in the example shown in FIG. 10, the first pixel group 11b and the second pixel group 12b consist of a plurality of pixels arranged at intermittent positions, respectively. According to the embodiment shown in FIG. 5, the calculation regarding one specified pixel 10 is limited to adding the luminance values of the pixels at the $n^{th}$ or $m^{th}$ positions therefrom. Therefore, the load required for the operation is originally light. Furthermore, if only pixels at intermittent positions are set as objects of the operation, the load required for the operation is substantially lighter. In the example shown in FIG. 11, plural pixels at positions forming an octagonal or circular arrangement form the first group of pixels 11c and the second group of pixels 12c. The example shown in FIG. 12 is a modified version of FIG. 11.

Figure 12:
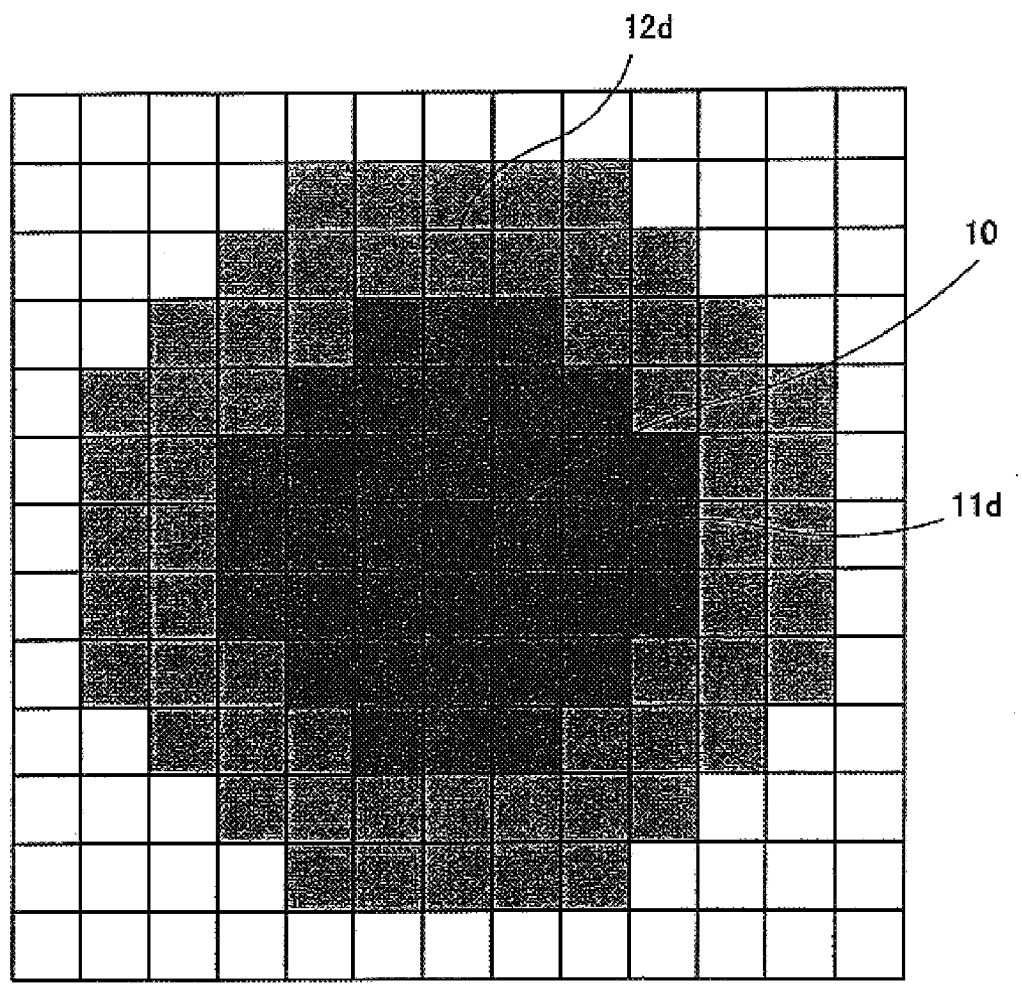

In FIG. 12, the first pixel group 11d is made of the entire pixel population surrounding the specified pixel 10, while the second pixel group 12d is made of pixels surrounding the first pixel group 11d. The first groups 11a to 11d and the second groups 12a to 12d, which are shown in FIG. 5 and FIGS. 10 to 12, respectively, are common to each other. Each group of first pixels 11a to 11d and second pixels 12a to 12d has an isotropic form without any orientation to the specified pixel 10. Moreover, each of the first pixel groups 11a to 11d and second pixel groups 12a to 12d has a linearly symmetrical (or point-symmetrical) shape with respect to the specified pixel 10. In order to properly extract the luminance unevenness, it is important to form the first pixel groups 11a to 11d and the second pixel groups 12a to 12d, preferably as described above.

S205: Calculation of Double Peripheral Difference Value

The double peripheral difference value can now be calculated by executing the operation based on equation (5), i.e., by adding the inner difference value and the outer difference value calculated respectively in S201 and S203. Here, a and b in equation (5) are the coefficients, which are positive numbers greater or equal to 0.

Processing steps S201, S203 and S205 are executed for the entire pixel population of the image data which was obtained by subdividing the image. Consequently, the double peripheral difference value indicates the relative luminance of each pixel.

Figure 6:
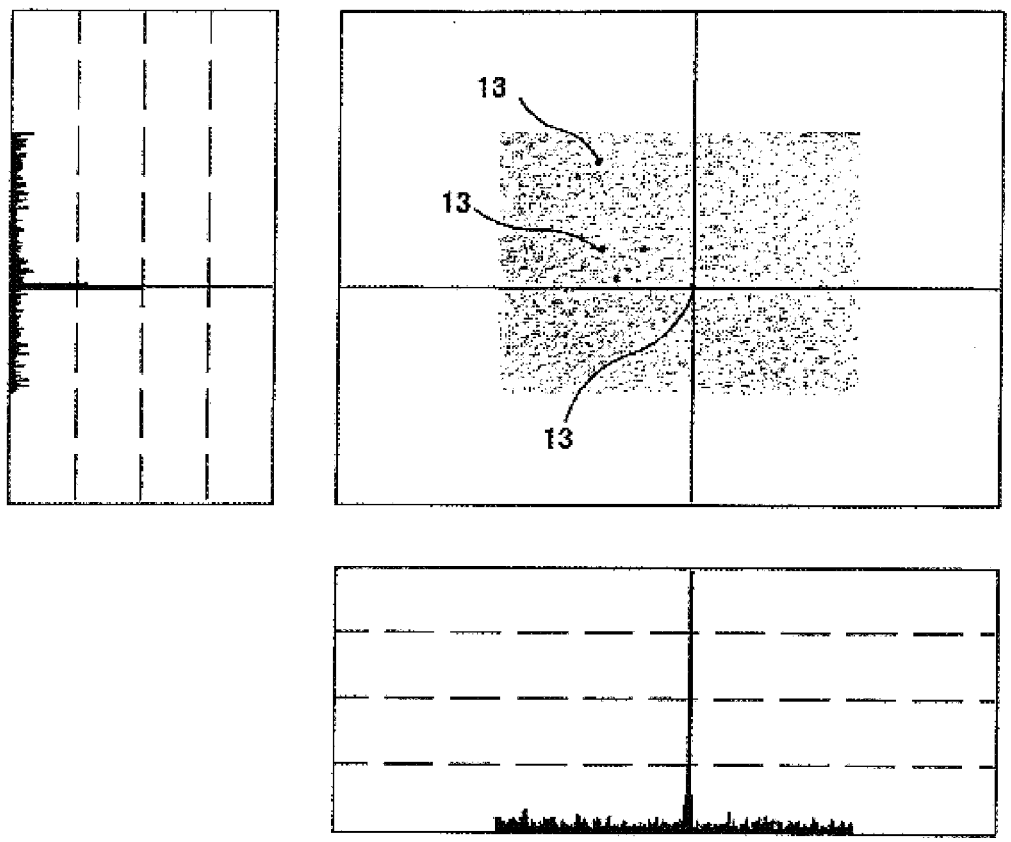
FIG. 6 shows the image data after reconverting a peripheral difference value obtained by setting n at 1 in equation (1) with reference to the image shown in FIG. 3.
Figure 7:
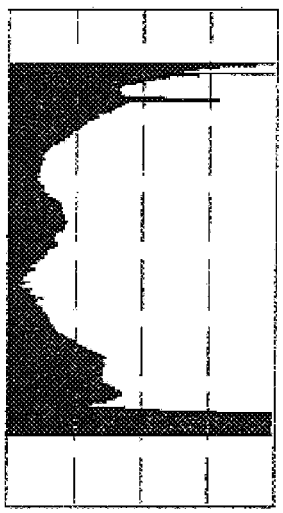
FIG. 7 shows the image data after reconverting a peripheral difference value obtained by setting m at 16 an equation (2) with reference to the image shown in FIG. 3.
Figure 7:
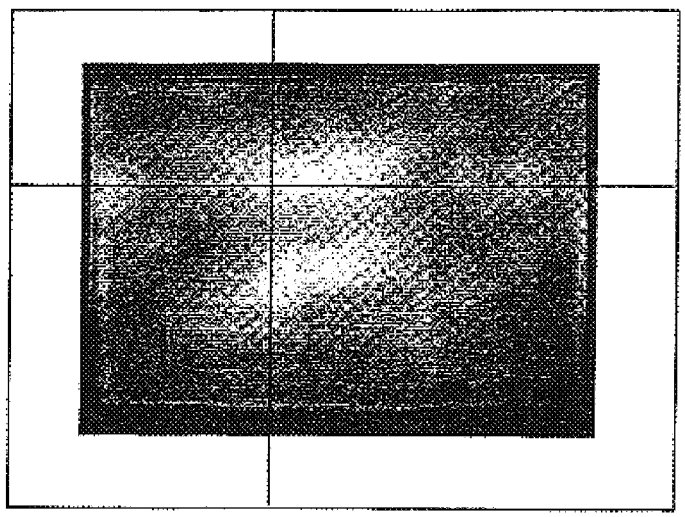
Figure 7:
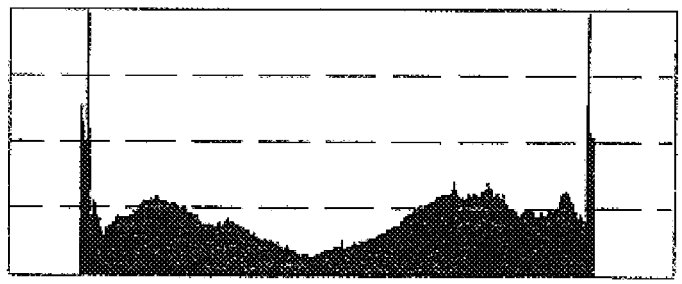
Figure 8:
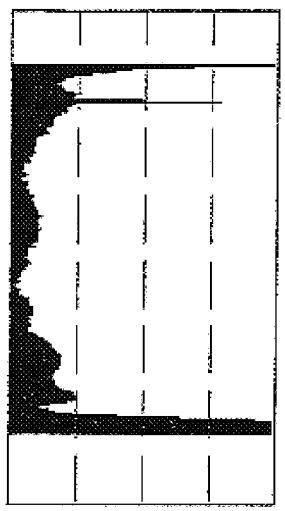
FIG. 8 shows the image data after reconverting a double peripheral difference value obtained by setting n at 1 and m at 16 in equation (3) with reference to the image shown in FIG. 3.
Figure 8:
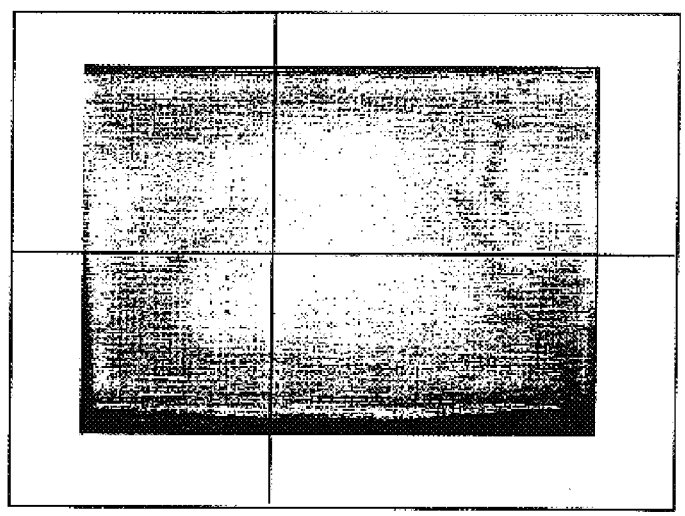
Figure 8:
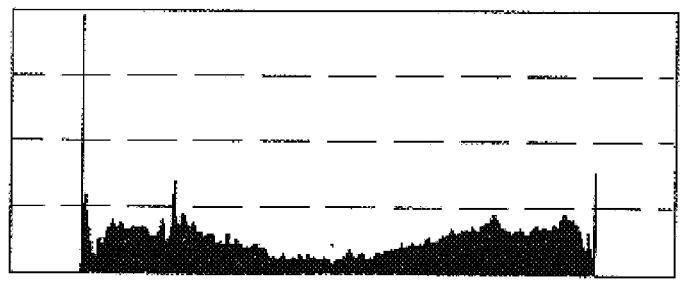

FIGS. 6, 7 and 8 show images obtained by reconverting the inner difference value obtained in S201, the outer difference value from S203 and the double peripheral difference value from S205, respectively. These images can be displayed on monitor 4. Note that the images are obtained when the foregoing n and m values are set to n=1 and m=16. Moreover, these images are based on results of the operation process performed when coefficient alpha is set to 1 in equation (4), coefficient a to 0.15 and coefficient b to 0.85 in equation (5).

Referring to FIG. 6, the image is obtained based on the inner difference value. It is understood that bright spots 13 are extracted, each contributing to forming the local luminance unevenness. Referring to FIG. 7, the image is based on the outer difference value, the luminance gradient caused on the entire screen is extracted as luminance unevenness. Referring to FIG. 8, the image is based on the double peripheral difference value obtained by adding the inner difference value and the outer difference value. It is understood that both, the bright spots 13 and the luminance gradient can be extracted. The graphs illustrated in FIGS. 6 to 8 show luminance values on cross-sections cut by straight lines drawn on the respective images. For instance, FIG. 6 shows the luminance value of the spot 13 at a section where two straight lines cross, and which is higher than at the periphery thereof.

In the present embodiment, the double peripheral difference value obtained by adding the inner difference value and the outer difference value is acquired. However, the image quality of the displayed image can be also evaluated by use only of the inner difference value or only of the outer difference value. Coefficient alpha in equation (4) is set to 1, the coefficient a to 0.15, and the coefficient b to 0.85 in equation (5). However, other values may also be used. The coefficients a and b determine the weights of the inner difference value and the outer difference value. The luminance unevenness can be extracted by determining the weights of the inner difference value and the outer difference value in accordance with the type of the luminance unevenness desired to be extracted. Also in this embodiment, as a result of various studies, the coefficients are determined as follows: a=0.15; and b=0.85. The resulting image is shown in FIG. 8. Generally, it is necessary to determine the coefficients a and b experimentally in accordance with a feature of the image desired to be extracted. Moreover, the coefficient alpha varies depending on the second pixel group 11a–11d for calculating the outer difference value. Specifically, when m takes a large value, the second term of equation (4) is very small in comparison with the first term. For example, assuming that m=20, the first term is the sum of luminance values on 160 pixels, and the luminance value of one pixel (specified pixel 10) is extremely small in comparison to the sum. Hence, in such a case, the second term can be ignored assuming that alpha is 0.

S109: Extraction of Singular Value Data

The double peripheral difference value obtained in S107, i.e., the relative luminance of each pixel is digitized by use of a specified threshold value. Singular value data extracted by such digitization is used for the image data inflation/deflation processing in S111.

S111: Image Inflation/deflation

Figure 9:
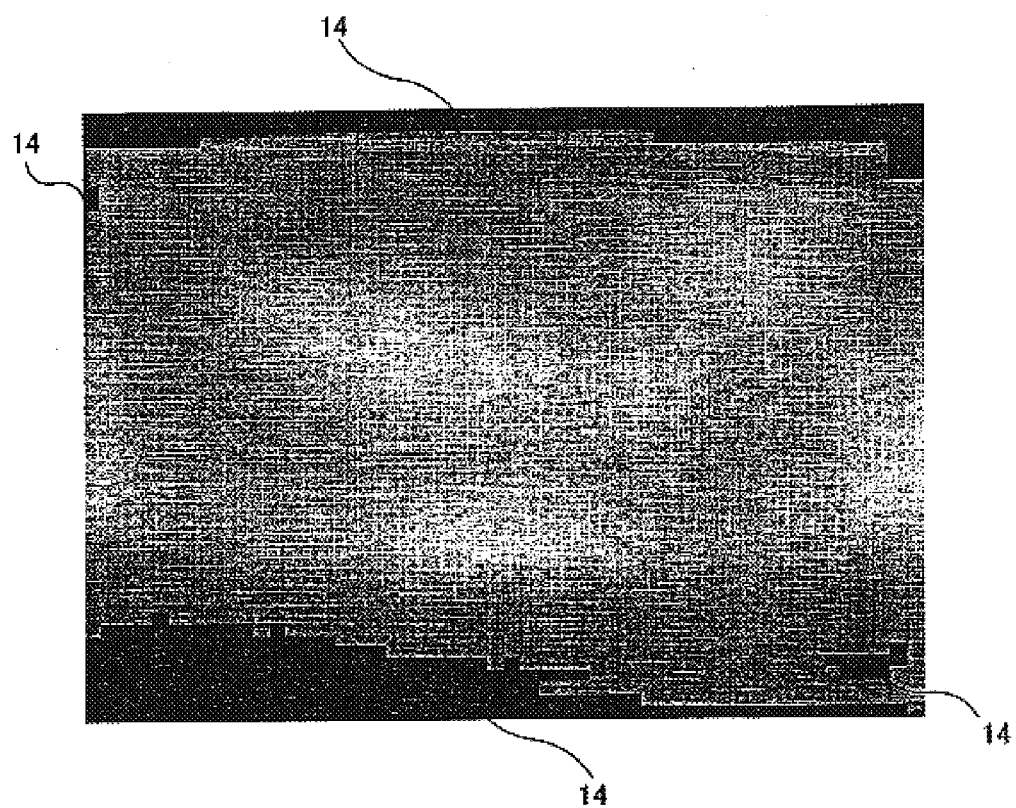
FIG. 9 showing the unevenness extracted by processing the image data shown in FIG. 6.

The singular value data obtained in S109 is subjected periodically to image inflation/deflation. The image inflation implies processing when the values of a figure component at a boundary thereof are entirely converted into pixel of a background component, with each being inflated by one pixel. Conversely, the image deflation implies processing when the values of the figure component are deflated each by one pixel. Noise can be removed by alternatively iterating the image inflation and deflation. Blocks are generated by pasting the singular value data subjected to the image inflation/deflation processing. FIG. 9 shows an image showing the generated blocks 14. The image is then displayed on monitor 4.

S113: Calculation of the Quantitative Value of Image Quality Evaluation

A quantitative value of image quality evaluation is calculated by use of each area of the generated blocks 14 and the luminance value of each block 14. For example, assuming that the area of block 14 is referenced by A, the average luminance value of the block 14 is C1, then, P=A×C1 is calculated. The image quality of the image displayed on the liquid crystal display 5 is evaluated using the value of P. This value is displayed on monitor 4 (S115). Not only the average luminance value C1 is used, but also the luminance values such as the maximum luminance value and the minimum luminance.

Although the preferred embodiment of the present invention has been described in detail, it should be understood that various changes, substitutions and alternations can be made therein without departing from spirit and scope of the inventions as defined by the appended claims.

What is claimed is:

1. A method of acquiring luminance information of a display device, comprising the steps of:
   subdividing an image displayed on said display device into a plurality of pixels;
   determining luminance values of pixels surrounding a predetermined pixel at selected positions of said divided image, said pixels surrounding said predetermined pixel forming a pixel group and adding said luminance values of said pixels forming said pixel group; and
   determining the luminance value of said predetermined pixel, and subtracting said luminance value of said predetermined pixel from the respective luminance values of said pixels forming said pixel group, said difference determining a luminance gradient and a measurement of a local luminance unevenness on said divided image.

2. The method according to claim 1, wherein said pixel group is an isotropic arrangement with respect to said preselected pixel.

3. The method according to claim 1, wherein said pixels forming said pixel group are spaced away from said predetermined pixel by a number of pixels.

4. The method according to claim 1, wherein said pixels forming said pixel group are positioned in a circular layout at alternating positions.

5. A method of evaluating the image quality of a display device comprising the steps of:
- subdividing a photographed image into a plurality of pixels;
- calculating a first luminance value as a difference between the sum of luminance values of predetermined pixels and the luminance value of a predetermined pixel, said predetermined pixels forming a first pixel group surrounding said predetermined pixel, said first luminance value calculation providing local luminance unevenness information;
- calculating a second luminance value as a difference between a sum of luminance values of predetermined pixels forming a second pixel group and the luminance value of said predetermined pixel, said predetermined pixels surrounding said predetermined pixel being positioned farther away from said predetermined pixel than pixels from said first pixel group, said second luminance calculation providing luminance unevenness information of the entire photographed image;
- obtaining a third luminance value based on said first luminance value and said second luminance value, said third luminance providing a double peripheral difference; and
- evaluating the luminance of said photographed screen based on said third luminance value to determine an acceptable level of quality.

6. The method according to claim 5, wherein said evaluation step includes a digitizing process step to extract singular value data by subjecting said third luminance value to said digitizing process by way of a threshold value.

7. The method according to claim 6, wherein said evaluation step further comprising the step of calculating an evaluation value by multiplying an area of a block to the collective luminance values of pixels within said block, said block relating to the singular value data obtained by said digitizing process step.

8. The method according to claim 5, wherein said third luminance calculation step adds said first luminance value to said second luminance value.

9. The method according to claim 8, wherein said third luminance calculation step assigns weights to said first luminance and said second luminance when adding said first luminance value to said second luminance value.

10. The method according to claim 9, wherein said weights are determined in response to a feature of the image to be evaluated.

11. An apparatus of acquiring luminance information of a display device, wherein the luminance information of an image displayed on the display device is acquired, comprising:
- photographic means for photographing the image displayed on said display device;
- image processing means for dividing image data relating to the image photographed by said photographic means; and
- operation means for executing operation processing represented by equation (1) for the image data subdivided by said image processing means, wherein equation (1) is represented by:

$$A(x,y)=[pi-I(x,y)] \quad (1)$$

wherein p represents luminance values of pixels forming a pixel group surrounding a pixel at a position of said image data defined by (x, y), and I(x, y) represents a luminance value of the pixel at the position defined by (x, y) of said image data.

12. The apparatus according to claim 11, wherein said operation means executes the operation processing represented by said equation (1) for all the pixels after subdividing the image data.

13. The apparatus according to claim 11, wherein pi in said equation (1) represents luminance information of a pixel at an $n^{th}$ position, n being an integer greater than 1, from the pixel existing at a position defined by (x, y).

14. An apparatus of evaluating image quality of a display device, wherein the quality of an image displayed on the display device is evaluated, comprising:
- photographic means for photographing the image displayed on said display device;
- image processing means for dividing image data relating to the image photographed by said photographic means; and
- operation means for executing operation processing represented by equation (2) for the entire image data divided by said image processing means and for quantifying the photographed image based on P(x, y) as luminance data obtained by said operation processing, wherein equation (2) being represented by:

$$A(x,y)=[\Sigma pi - I(x,y)] \quad (1)$$

where
- pi are luminance values of pixels forming a first pixel group arranged linearly in a symmetrical form with respect to a position of said image data defined by (x, y),
- po are luminance values of pixels constituting a second pixel group forming a linearly symmetrical form with respect to the position of said image data defined by (x, y), said second pixel group being located outside of said first pixel group, wherein
- I(x, y) is the luminance value of a pixel at the position defined by (x, y) of said image, and
- a, b, c are coefficients either 0 or a positive number.

15. The apparatus according to claim 14, wherein said first pixel group is formed by pixels in the $n^{th}$ positions, n being an integer >1, relative to the pixel at a position of said image defined by (x, y), and said second pixel group is formed by pixels in the $m^{th}$ positions, m being an integer greater than n, relative to the pixel existing at the position defined by (x, y).

16. The apparatus according to claim 15, wherein the value of alpha is determined in response to a value of said m.

17. The apparatus according to claim 14, wherein said a and b satisfy a+b=1.0, and are determined in response to a feature of an image to be evaluated.

* * * * *